United States Patent [19]

Benman, Jr.

[11] Patent Number: 5,784,546
[45] Date of Patent: Jul. 21, 1998

[54] INTEGRATED VIRTUAL NETWORKS

[75] Inventor: William J. Benman, Jr., Los angeles, Calif.

[73] Assignee: Integrated Virtual Networks, Los Angeles, Calif.

[21] Appl. No.: 241,732

[22] Filed: May 12, 1994

[51] Int. Cl.[6] ................................................ G06T 7/20
[52] U.S. Cl. ................................................ 395/154
[58] Field of Search ........................ 395/118, 119, 395/154, 155

[56] References Cited

U.S. PATENT DOCUMENTS

| | | | |
|---|---|---|---|
| 5,130,794 | 7/1992 | Ritchey | 358/87 |
| 5,175,855 | 12/1992 | Putnam et al. | 395/700 |
| 5,310,349 | 5/1994 | Daniels et al. | 434/350 |
| 5,374,952 | 12/1994 | Flohr | 348/12 |
| 5,388,990 | 2/1995 | Beckman | 434/38 |
| 5,414,801 | 5/1995 | Smith et al. | 395/119 |
| 5,487,141 | 1/1996 | Cain et al. | 395/135 |

OTHER PUBLICATIONS

Borland, Quattro Pro for Windows User Guide. 1993, pp. 15–18.
Coffin, UNIX System V Release 4, 1990, p. 315.

Primary Examiner—Heather R. Herndon
Assistant Examiner—Anton W. Fetting

[57] ABSTRACT

A virtual workstation includes a virtual environment controller for creating a display of a virtual representation of a work area and tools and assets therein. A virtual interface processes inputs from a user and provides environmental control signals to the environmental controller which adjusts the display to provide an image which allows the user to move within the work area and access tools and assets virtually. An intuitive controller activates the tools and assets in background for virtual access by anticipating access based on virtual motion within the environment. A first embodiment provides a realistic three dimensional office representation in a network of workstations facilitating remote management and supervision by providing virtual or real images of coworkers on intuitive command. A second embodiment provides a virtual trade show with live or virtual imagery allowing the user to attend remotely as the trade show happens.

40 Claims, 4 Drawing Sheets

INTEGRATED VIRTUAL NETWORKS

BACKGROUND OF THE INVENTION

1. Field of the Invention:

The present invention relates to computers and communication systems. More specifically, the present invention relates to virtual systems, computers and software systems and communication networks.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Notwithstanding the exigencies of business, it is often impossible, impractical or too costly for an individual or a group of individuals to be physically present at a particular location at a particular time.

For example, after the earthquakes in Los Angeles in 1994, many freeways were disabled for several months. Inasmuch as many of the freeways were on the verge of gridlock prior to the earthquake, traffic congestion after the destruction was such that for thousands of workers, a previously typical one-half hour commute to work became a two hour exercise in frustration. The cost to businesses was estimated to be on the order of millions of dollars per day. Accordingly, alternatives to the automotive commute were seriously evaluated.

One such alternative was "telecommuting". Telecommuting is a concept by which business is conducted in the home and communicated to the office or other locations via conventional telephone lines and other communication systems. While the vision of a large percentage of the workforce telecommuting has been discussed for years, corporate receptivity to the concept, even after the earthquakes of '94, has been lukewarm due, at least in part to the fact that conventional telecommunication systems do not allow for close management and/or supervision of subordinate employees. Thus, despite the fact that studies indicate the those that work out of the home are at least as productive as those that work in a conventional office environment (and, in some cases, significantly more productive), most companies simply do not allow a significant percentage of their workforce to telecommute. As a result, telecommuting has heretofore not provided a strong incentive for an investment in the equipment needed in the home to telecommute effectively. Given the lack of support for the concept on the part of employers, it has not been realistic to expect employers to invest in the equipment to provide even the limited telecommunications capability currently available. Hence, suppliers of such equipment have not generally provided equipment designed to facilitate telecommuting per se. Instead, suppliers of such equipment continue to use conventional market models and design equipment (such as fax machines and the like) for the business office and low cost, low duty cycle alternatives of same for the home. Currently, little is being done to provide telecommunications equipment which addresses the remote management and supervision problem. While there are some video teleconferencing systems on the market which provide face-to-face communication, these systems have traditionally been too expensive to be put in thousands of homes.

More recently, some products have been introduced which provide limited video interfacing and document sharing through a personal computer. ProShare$_{tm}$ from Intel and Pacific Telesis, ShareView$_{tm}$ from ShareVision, and CAMEO$_{tm}$ from Compression Labs Incorporated are exemplary of such systems. Unfortunately, the performance of these systems is limited by the fact that video communication and the document sharing are constrained through a monitor. Use of multiple monitors is not envisioned as it would significantly increase the cost and complexity of the system. The use of a single monitor to display data and video constrains the system with respect to the amount of information which may displayed at any given time.

In addition, system control is implemented primarily through a keyboard interface. While this may be suitable in a single application, and despite an availability of onscreen icons, keyboard control is still substantially more cumbersome, when moving from task to task, than working at one's desk for example. That is, when working in a real environment, one moves quickly and easily back and forth between files, documents, tools and appliances while carrying on conversations with coworkers directly or over the telephone. Thus, while computers allow for efficient performance of tasks using word processors, database programs and the like, the conventional computer interface is limited as a platform for creating a virtual work environment, particularly in the video telephone conferencing application critical to telecommuting.

Accordingly, a need remains in the art for a system for providing a virtual office environment which integrates telecommunications and computer-based tools in a manner that simulates a real office environment. Further, assuming that such a virtual office system could be provided, there would be a further need for a system for networking such virtual offices to provide real time two way communication to optimize the utility thereof and to facilitate remote management and supervision.

SUMMARY OF THE INVENTION

The need in the art is addressed by the present invention which provides a virtual workstation and a network of virtual workstations. Each virtual workstation includes a virtual environment controller for creating a display of a virtual representation of a work area and tools and assets therein. A virtual interface processes inputs from a user and provides environment control signals to the environment controller. The environment controller then adjusts the display to provide an image which appears to allow the user to virtually move within the work area and access the tools and assets therein. An intuitive controller is provided for activating each of the tools and assets when the respective tool or asset is accessed virtually in the environment.

In a first embodiment, the invention provides a realistic three-dimensional representation of an office. In this embodiment, one of the assets would typically be a document in a file. The virtual environment controller provides a realistic graphical representation of the file and of the document in the file. When the user virtually handles the document, the intuitive controller automatically activates a word processing program and accesses a corresponding text file. When the user inserts the virtual document into a virtual fax machine, the intuitive controller automatically activates an internal fax machine an transmits to the document to a designated number.

In a preferred embodiment, a plurality of workstations are networked together over a direct broadcast satellite network or other suitable network. To facilitate remote management and supervision, the invention provides a virtual or real image of coworkers on command. Thus, one user may virtually walk into the office of another worker and have a face-to-face meeting while viewing and editing a common document.

In an alternative embodiment, the invention provides for a virtual trade show. In this embodiment, the invention provides either live or virtual imagery of the trade show. The live image allows the user to attend the trade show remotely as it happens. For example, the invention allows for a camera at the trade show to move through the show under remote control. This imagery may be combined with virtual imagery which may depict a top level graphical directory or floor plan of the show. As the user visits each virtual booth, the user is able to view video and other simulations provided by the vendor. All of this may be stored for later presentation to others. With a simple command, the user may request information, order product and/or arrange meetings with the vendor.

DESCRIPTION OF THE INVENTION

Illustrative embodiments and exemplary applications will now be described with reference to the accompanying drawings to disclose the advantageous teachings of the present invention.

Virtual Office

Figure 1:
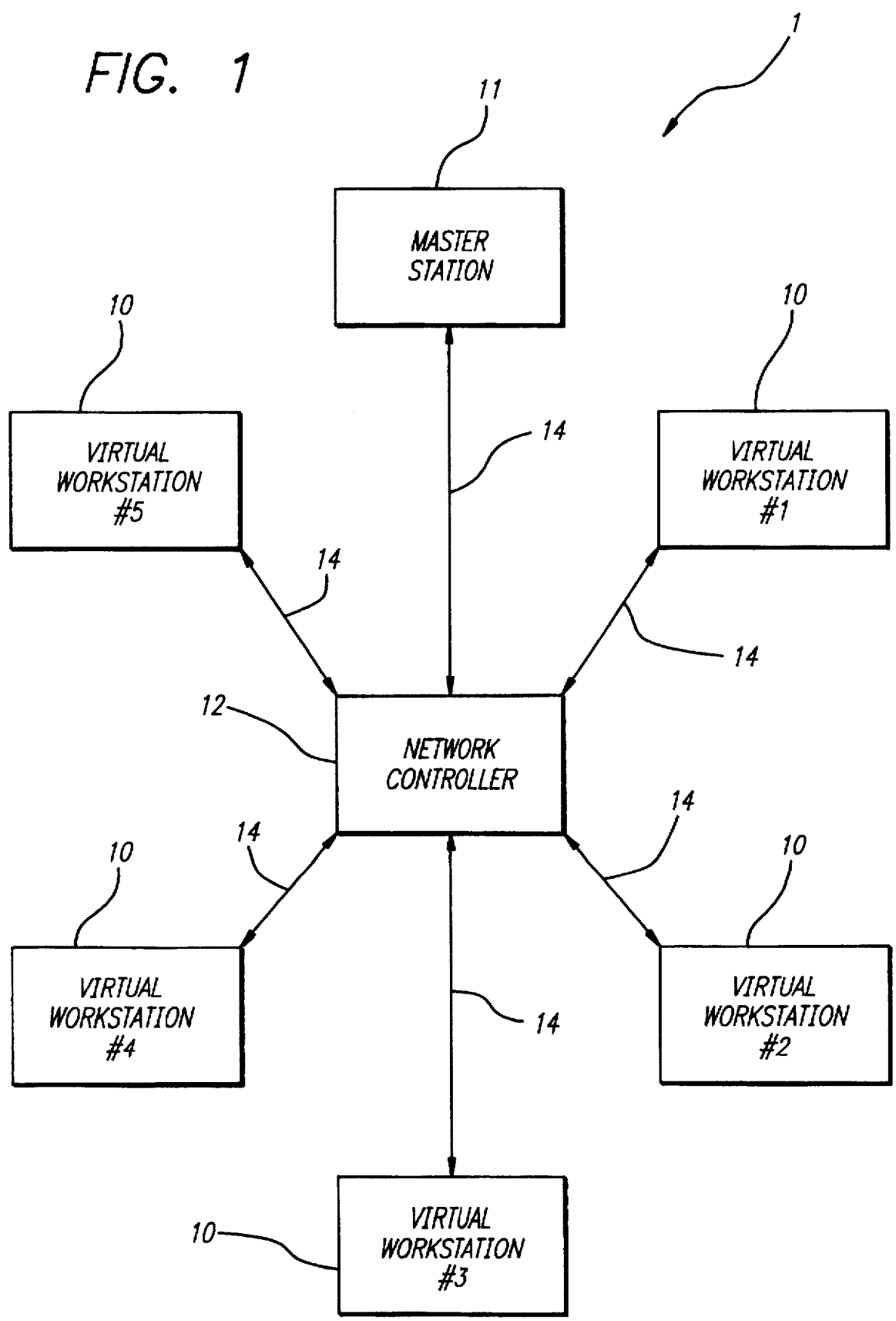
FIG. 1 is a simplified block diagram of an illustrative implementation of a wide area virtual network in accordance with the teachings of the present invention.

FIG. 1 is a simplified block diagram of an illustrative implementation of a wide area virtual network in accordance with the teachings of the present invention. The network 1 comprises a number of virtual workstations 10 and 11. The workstations 10 and 11 are essentially identical with the exception that the workstation 11 is a master workstation. While few workstations are shown, in practice, a much larger number of workstations would be attached to the network 1. In a virtual office implementation, the master workstation 11, which would be used by a manager or supervisor, may be provided with special capabilities and would receive priority handling by a network controller 12. The workstations 10 are connected to the controller 12 by a network link 14. The network link may be by way of direct broadcast satellite transmission, ISDN telephone lines, fiber optic lines or cable television lines. The network controller 12 may be a conventional wide area network controller and routs video, audio, and data from one workstation to another. In the best mode, the network controller 12 is a packet switching system by which routing is effected by use of digital headers which designate the origin and destination of a packet of data.

Figure 2:
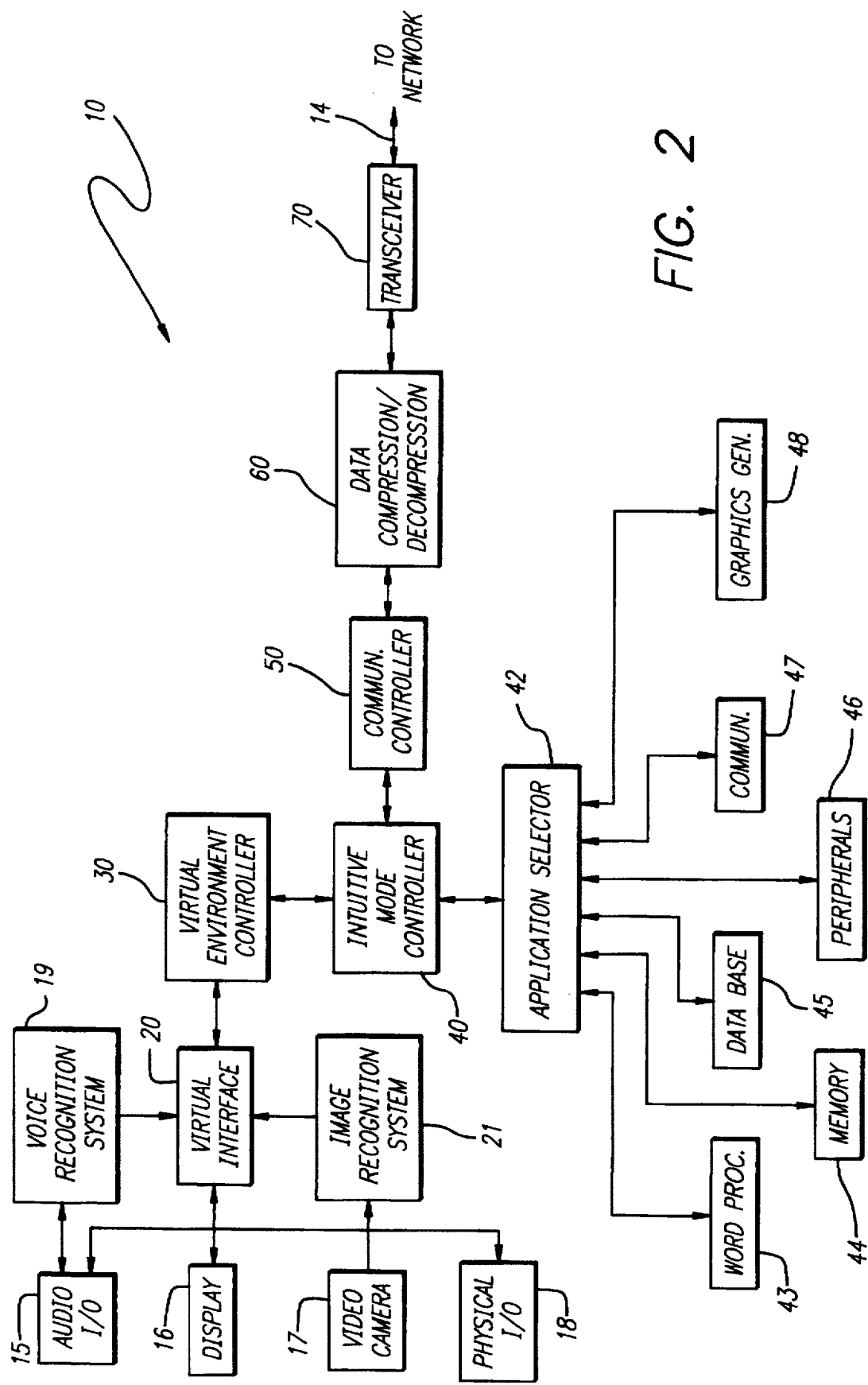
FIG. 2 is a block diagram of an illustrative implementation of a workstation for a virtual office application.

FIG. 2 is a block diagram of an illustrative implementation of a workstation for a virtual office application. The workstation 10 includes an audio input and output system 15 which, in the best mode, is implemented with wireless headsets or microphones and conventional speakers. In addition, the audio I/O system 15 is adapted for connection to conventional telephone lines. The audio I/O system 15 is connected to a conventional voice recognition system 19 to facilitate the communication of verbal commands to the system 10.

Video input and output are effected with a display 16 and a video camera 17. While the display 16 may be implemented with a monitor, in the best mode, wide field-of-view, full color, high resolution, real time three-dimensional virtual displays would be utilized such as head mounted displays or wall projectors.

Optional floor sensors, data gloves and other conventional virtual transducers may be used for physical input and output 18. However, in the best mode, the system described and claimed in U.S. Pat. No. 4,843,568, issued Jun. 27, 1989 to Myron W. Krueger et al., and entitled REAL TIME PERCEPTION OF AND RESPONSE TO THE ACTIONS OF AN UNENCUMBERED PARTICIPANT/USER, the teachings of which are incorporated herein by reference, would be used. This system provides an apparatus and method for using an image of the human body to control real time computer events without the requirement of any marking or devices to be worn by the participant. The teaching of this patent would be implemented in the image recognition system 21. The image recognition system provides virtual output data along with conventional digitized video data.

The voice and image recognition systems 19 and 21 are connected to a virtual interface 20. The virtual interface is implemented with a microprocessor, digital logic circuit or other suitable system. The virtual interface processes the video, audio and virtual position, orientation and movement inputs to provide environment control output signals.

The environment control output signals are input to a virtual environment controller 30. The virtual environment controller 30 may be implemented with any of a variety of real time virtual environment editors currently on the market such as VREAM$_{tm}$ from VREAM Inc.; Sense8 WorldTool-Kit$_{tm}$; and Autodesk Cyberspace Developer's Kit. These devices allow one to create and store a virtual environment and to move around within the environment.

Figure 3:
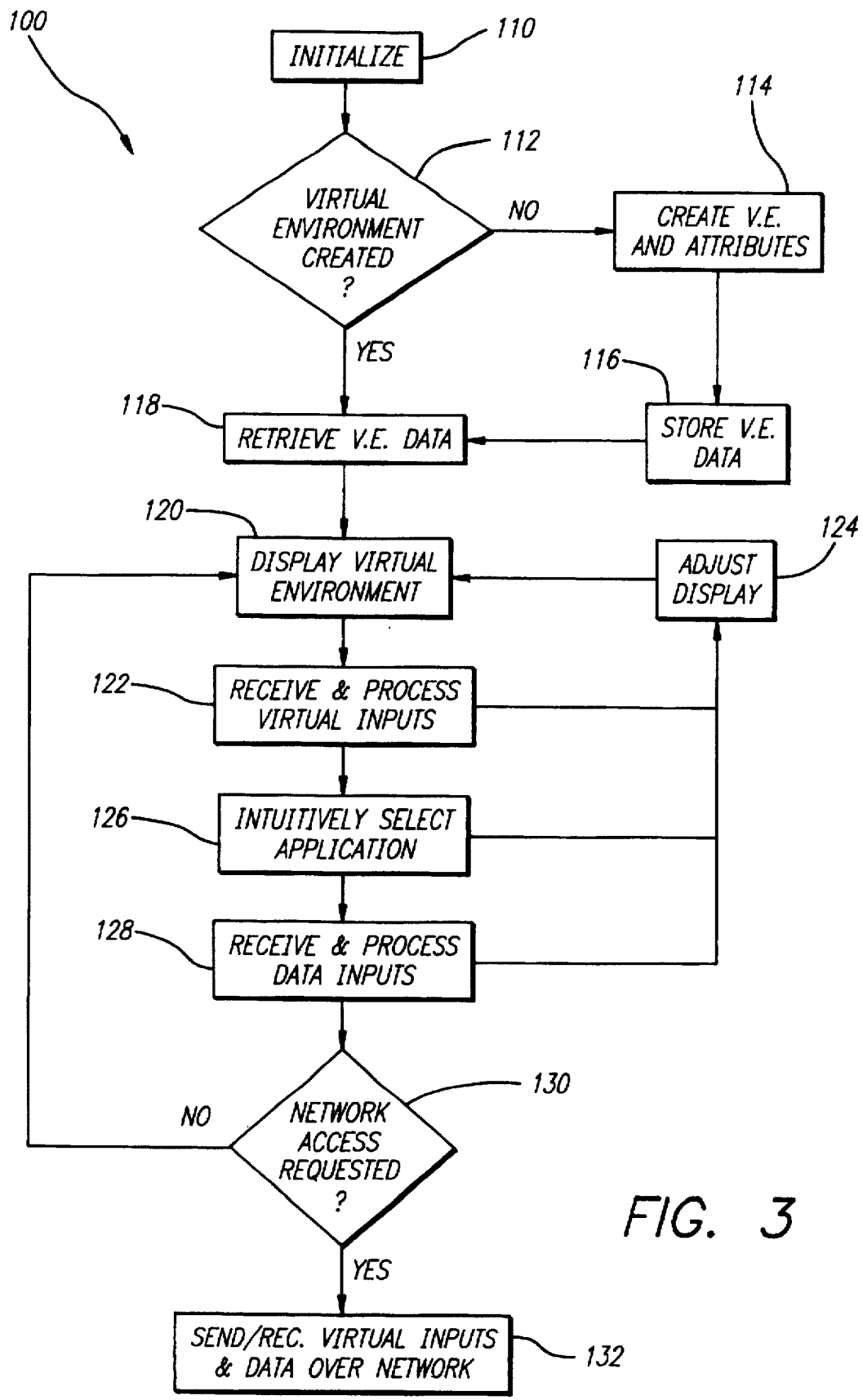
FIG. 3 is a flow chart of the method of the present invention.

FIG. 3 is a flow chart of the method of the present invention. The present invention is best understood with reference to the following definition of terms:

assets: documents, files, programs, equipment, furniture, books, anything used in an environment which is implemented in the virtual work area;

access: view, approach, scan, handle, open and close drawers and files in the virtual work area as one would in a physical work area and etc.;

virtually: using a virtual interface to operate within the virtual work area;

virtually accessing: viewing, approaching, scanning, handling, opening, closing an asset in the virtual work area as one would in a physical work area; and accessed virtually: the activation of tools and assets by movement and position in the virtual environment. In accordance with the present teachings, at steps 110–118 (even numbers only) the system is initialized. The camera 17 is used to input digital imagery of a custom office environment including a desk, files cabinets, computer, telephone, facsimile and other tools and assets. In the alternative, a "factory created" work environment may be used. Next, the attributes of each of the tools and assets are stored. For example, a desk would have the attributes of a surface on which items may rest. Hence, one may leave documents on the desk for viewing (by one or more users), word processing or for handwriting thereon. The file cabinets would take on the attributes of a database such that as each is accessed by a virtual hand, avatar or voice command, the contents thereof are displayed as files. Each drawer and each file would also have the attributes of a database. Once a file is opened, each document is displayed as a graphical representation of a sheet of paper. Documents would have the attributes of a word processing, spreadsheet, and graphical files.

While the virtual environment controller 30 stores and updates the virtual environment for display (step 120), a mode controller (computer) 40 receives and processes the virtual inputs and intuits the application tool to be selected based on the stored attributes of the tool and assets being accessed within the environment (steps 120 and 122). Thus, for example, as the user moves through the virtual office and pulls a file out of a drawer using a hand, an avatar or voice command, the intuitive mode controller 40 automatically selects a database tool 45 via an application selector 42. The database 45 displays a list of the contents of the virtual file cabinets on the display 16 as virtual files. When a document is selected, the user may place it on the desk. Simultaneously, the mode controller 40 intuitively selects a word processing program and brings up a file corresponding to the graphical representation of the file in response to virtual and/or real keyboard inputs as well as other inputs (e.g., voice). This is depicted at step 128. In this process, other tools including memory 44 and peripherals (such as offline storage devices) are used in a conventional manner.

The intuitive mode controller 40 may be implemented with a fuzzy logic processor, a conventional processor with a lookup table of "if-then" conditions, a state machine implemented digitally or by other suitable means. Thus, if the user's hand moves toward a tool, the tool is activated and running on standby in the background so the user would not experience a delay in bringing up and in using the tool.

Those skilled in the art will appreciate that the invention provides a virtual operating system which processes inputs from a user to intuitively identify a virtual tool being accessed by a user and then selects and activates the tool. The virtual operating system of the present invention is called "VIOS" (Virtual Input Output System) for a workstation in standalone mode and "VNOS" (Virtual Network Operating System) for a workstation operating in a network mode. VNOS utilizes intuitive fuzzy processing to switch output to the network controller and request network access when, for example, the user moves out of the virtual office and "down the virtual hall" or "out of the virtual building". When a user walks toward the office of another, the system begins to effect the connection through the network controller 12. When the connection is complete, access to the user's virtual environment may be effected. At this point, each user's system will display a real or virtual image of the remote user and the remote user's virtual environment from their respective perspectives.

The application selector 42 may be implemented in a Windowstm environment with Microsoft Office_tm suite of software or by numerous other means well within the capability of one of ordinary skill in the art.

After the document is edited, it may be transmitted to a remote location via an internal facsimile system depicted as a communications tool 47.

At any time, network access may be requested by the user or by users of other workstations in the network 1. (See step 130 in FIG. 3.) If so, the communications controller 50 of FIG. 2 is activated. The communications controller 50 works with a data compression/decompression system 60 to format and compress the video, audio and virtual data (data relating to the virtual environment and inputs to same) into an output data stream suitable for transmission onto the network by a conventional high speed data transceiver 70. Conversely, when data is received from the network 1 via the link 14 and the transceiver 14, it is decompressed by the decompression system 60 and formatted for input to the computer/controller 40.

Thus, one user may virtually walk into the office of another worker and have a face-to-face meeting while viewing and editing a common document. For privacy, the user may disable network access.

Virtual Trade Show

Figure 4:
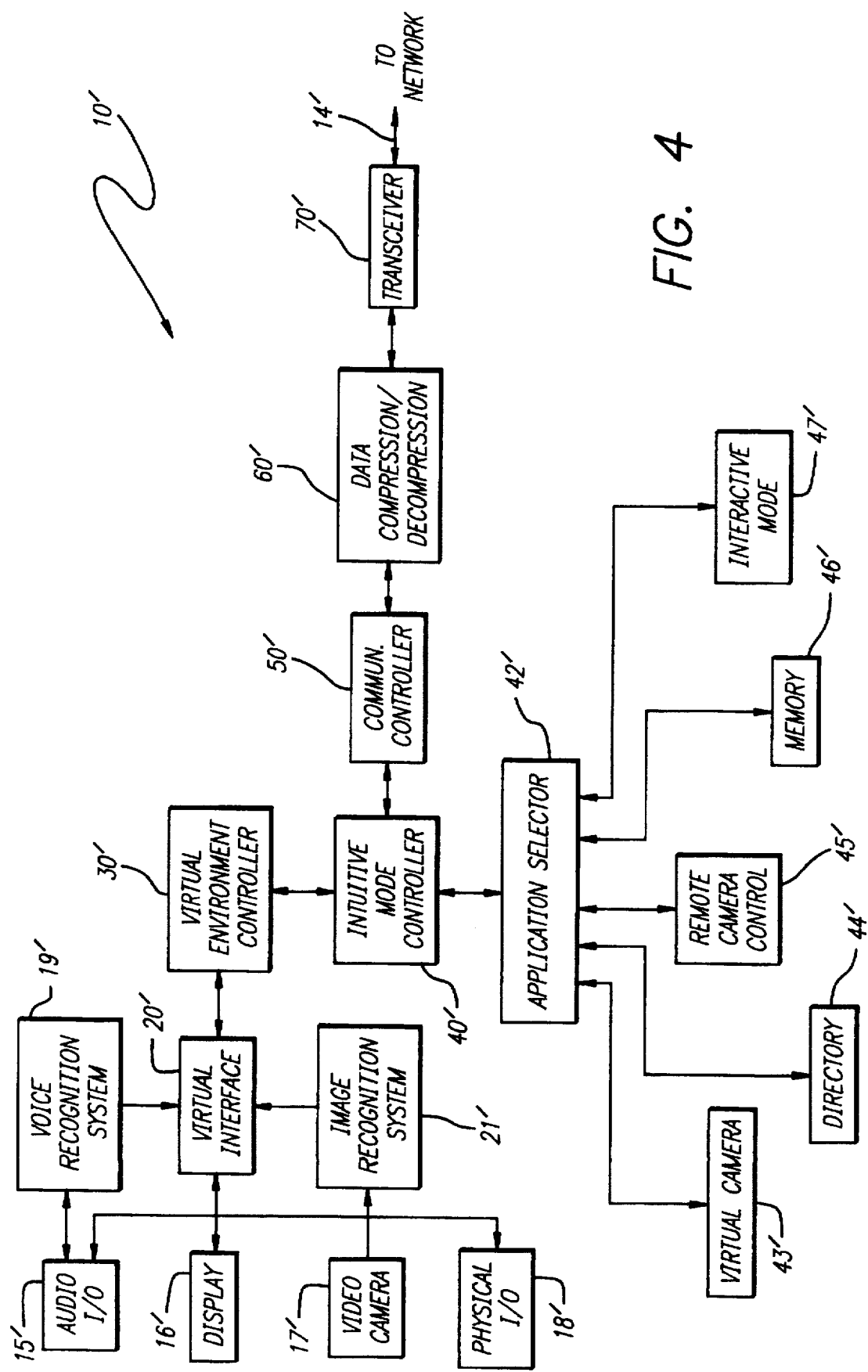
FIG. 4 is a block diagram of an illustrative implementation of a workstation for a virtual trade show application.

FIG. 4 is a block diagram of an illustrative implementation of a workstation for a virtual trade show application. This system 10' is essentially identical to that of FIG. 2 with the exception that the application tools have been changed. Thus, this mode of operation is software selectable and inherent in the system of FIG. 2.

In this embodiment, the invention provides either live or virtual imagery of a trade show. In accordance with the present teachings, a camera at the trade show is remotely controlled to move through the show. The camera may be carried by a person hired for the purpose or by a robot. This imagery may be combined with virtual imagery which may depict a top level graphical directory or floor plan of the show. As the user visits each virtual booth, the user is able to view video and other simulations provided by the vendor. With a simple command, the user may request information, order product and/or arrange meetings with the vendor. All of this may be stored for later presentation to others. In interactive mode, the user may participate in conferences and meetings. For this purpose, a remote display would be used.

Thus, the present invention has been described herein with reference to a particular embodiment for a particular application. Those having ordinary skill in the art and access to the present teachings will recognize additional modifications applications and embodiments within the scope thereof. For example, the invention is not limited to "virtual office" and "virtual trade show" implementations. The present teachings may be used to provide a "virtual bulletin board" or other interactive virtual networks.

It is therefore intended by the appended claims to cover any and all such applications, modifications and embodiments within the scope of the present invention.

Accordingly,

What is claimed is:

1. A virtual workstation comprising:
   virtual environment controller means for creating a display of a virtual representation of a work area and tools and assets therein;
   virtual interfacing means for processing inputs from a user to provide environment control signals to said environment controller means by which said environment controller means adjusts the display to provide an image which appears to allow the user to move within said work area and utilize said tools and assets depicted therein; and
   intuitive control means for initiating a background execution of an operation relating to a particular tool or asset based solely on the apparent movement of the user in said work area relative to the respective tool or asset.

2. The invention of claim 1 wherein said virtual interfacing means includes means for identifying physical movement of said user and translating same into said control signals.

3. The invention of claim 2 wherein said virtual interfacing means includes means for accepting audio and video inputs from said user.

4. The invention of claim 3 wherein said virtual interfacing means further includes means for accepting physical movement inputs from said user.

5. The invention of claim 1 wherein said virtual environment controller includes means for creating a three-dimensional representation of an office.

6. The invention of claim 5 wherein one of said assets is a document in a file.

7. The invention of claim 6 wherein said virtual environment controller means provides a graphical representation of said file.

8. The invention of claim 7 wherein said virtual environment controller means provides a graphical representation of said document in said file.

9. The invention of claim 8 wherein said tool is a word processing program.

10. The invention of claim 9 wherein said intuitive control means activates said word processing program and accesses a text file corresponding to said graphical representation of said document whenever said document is accessed by said user via said virtual interface.

11. The invention of claim 8 wherein said tool is a communications device.

12. The invention of claim 11 wherein said intuitive control means activates said communications device and transmits said document over said communications device whenever said document and said communications device are virtually accessed by said user.

13. The invention of claim 1 including means for connecting said workstation to a network.

14. The invention of claim 13 wherein said network comprises a plurality of said workstations.

15. The invention of claim 14 further including means for providing an image of users of said plurality of workstations in said work area.

16. The invention of claim 15 further including means for displaying the assets of at least one of said plurality of workstations in said work area.

17. The invention of claim 13 including means for providing video of a remote trade show.

18. The invention of claim 17 wherein said video is a virtual representation of said trade show.

19. The invention of claim 18 wherein one of said tools further includes means for virtually moving through said trade show.

20. The invention of claim 19 wherein one of said tools is graphical depiction of a directory of exhibitors at said trade show.

21. The invention of claim 17 wherein said video is live video.

22. The invention of claim 21 wherein one of said tools controls a remote camera located at said trade show.

23. The invention of claim 22 further including means for displaying an image of said user at said trade show.

24. The invention of claim 17 including means for providing interactive real, virtual and simulated imagery of a trade show.

25. The invention of claim 24 including means for storing said imagery of said trade show.

26. The invention of claim 1 wherein said operation is a launching of an application program on a computer.

27. The invention of claim 1 wherein the operation is a passing of data between application programs running on a computer.

28. The invention of claim 1 wherein said intuitive control means includes means for initiating a background execution of an operation utilizing a system resource which is independent from the environment controller means and which relates to a particular tool or asset being accessed, based solely on the apparent movement of the user in said work area relative to the respective tool or asset.

29. The invention of claim 28 wherein said system resource corresponds to a particular tool or asset being accessed.

30. The invention of claim 29 wherein said system resource is unique to said tool or asset.

31. The invention of claim 30 wherein said system resource is a device.

32. The invention of claim 28 wherein said system resource is an applications program.

33. The invention of claim 32 wherein said applications program exports data into said environment.

34. A virtual network comprising a plurality of virtual workstations interconnected via a wide area network, at least one of said virtual workstations comprising:

virtual environment controller means for creating and displaying a virtual representation of tools and assets in a work area;

virtual interfacing means for allowing a user to move within said work area and utilize said tools and assets depicted therein; and intuitive means for initiating a background execution of an operation relating to a particular tool or asset based solely on the apparent movement of the user in said work area relative to the respective tool or asset.

35. The invention of claim 34 further including network control means for selectively interconnecting said virtual workstations.

36. The invention of claim 34 wherein said operation is a launching of an application program on a computer.

37. The invention of claim 34 wherein the operation is a passing of data between application programs running on a computer.

38. A method for providing a virtual workstation including the steps of:

creating a display of a virtual representation of a work area and tools and assets therein;

processing inputs from a user to provide environment control signals;

adjusting the display in response to said environment control signals to provide an image which appears to allow the user to virtually move within said work area and utilize said tools and assets therein, and intuitively activating each of said tools and assets by initiating a background execution of an operation relating to a particular tool or asset based solely on the apparent movement of the user in said work area relative to the respective tool or asset.

39. The invention of claim 38 said operation is a launching of an application program on a computer.

40. The invention of claim 38 wherein the operation is a passing of data between application programs running on a computer.

* * * * *